United States Patent [19]

Penner et al.

[11] Patent Number: 5,327,512
[45] Date of Patent: Jul. 5, 1994

[54] LANGMUIR-BLODGETT FILM IN AN INTEGRATED ELECTRO-OPTICAL SCANNER

[75] Inventors: Thomas L. Penner, Fairport; Nancy J. Armstrong, Ontario; David J. Williams, Fairport; Joseph F. Revelli, Rochester, all of N.Y.

[73] Assignee: Eastman Kodak Company, Rochester, N.Y.

[21] Appl. No.: 24,716

[22] Filed: Mar. 1, 1993

[51] Int. Cl.$^5$ ............................................. G02B 6/10
[52] U.S. Cl. ............................................. 385/3; 359/245; 385/141
[58] Field of Search ............................................. 385/1-3, 385/8, 141–143, 122; 359/237, 245

[56] References Cited

U.S. PATENT DOCUMENTS

| | | | |
|---|---|---|---|
| 4,367,925 | 1/1983 | Sprague et al. | 350/355 |
| 4,386,827 | 6/1983 | Scifres et al. | 350/356 |
| 4,792,208 | 12/1988 | Ulman et al. | 350/96.34 |
| 4,796,971 | 1/1989 | Robello et al. | 385/11 |
| 4,936,645 | 6/1990 | Yoon et al. | 385/2 |
| 4,946,235 | 8/1990 | Scozzafava et al. | 350/96.34 |
| 4,948,225 | 8/1990 | Rider et al. | 350/96.34 |
| 4,955,977 | 9/1990 | Dao et al. | 350/96.34 |
| 4,971,426 | 11/1990 | Schildkraut et al. | 350/385 |
| 4,974,942 | 12/1990 | Gross et al. | 385/2 X |
| 5,009,483 | 4/1991 | Rockwell, III | 385/2 X |
| 5,052,771 | 10/1991 | Williams et al. | 385/8 |
| 5,093,874 | 3/1992 | Hawkins et al. | 385/8 |
| 5,115,336 | 5/1992 | Schildkraut et al. | 359/245 X |
| 5,150,446 | 9/1992 | Penner et al. | 385/122 |
| 5,247,602 | 9/1993 | Penner et al. | 385/122 |

OTHER PUBLICATIONS

Hsiung et al., "Optical second–harmonic generation in Langmuir–Blodgett multilayers of polyacrylates and polyoxazolines with fluorinated side groups," Chemical Physics Letters, 182, No. 1, 88–92 (Jul. 1991).

*Primary Examiner*—John D. Lee
*Attorney, Agent, or Firm*—Raymond L. Owens

[57] ABSTRACT

A fully integrated electro-optic page-scanner comprises an optically-transparent waveguide made from an electro-optic polymer formed as a Langmuir-Blodgett film, and a linear array of electrically-addressable, spaced, parallel electrodes for selectively altering the refractive index across pixel-sized portions of the polymeric waveguide. Parallel addressing of the electrodes in accordance with the intensity pattern of a line of pixels to be recorded acts to modulate the phase front of an optical wave propagating within the waveguide in accordance with such line intensity pattern. Schlieren optics, also integrated with the page-scanner, convert the phase-front-modulated wave to an intensity-modulated pixel pattern which can be imaged onto a moving photosensitive recording element to record a two-dimensional (page) of image information. By using an electro-optic polymer formed as a Langmuir-Blodgett film as the waveguide, certain disadvantages of prior art scanning devices are eliminated.

14 Claims, 3 Drawing Sheets

LANGMUIR-BLODGETT FILM IN AN INTEGRATED ELECTRO-OPTICAL SCANNER

TECHNICAL FIELD OF THE INVENTION

This invention relates to an electro-optic scanning device for delivering information-modulated light to a photosensitive surface in an optical information recording apparatus, such as electrophotographic printers and copiers.

BACKGROUND OF THE INVENTION

It is known to record optical information on a moving photosensitive medium by directing a sheet-like beam of collimated light through electro-optic crystal materials (e.g., lithium niobate or lithium tantalate) while modulating the phase front of the beam to form a scanning line of picture elements or "pixels" across the width of the recording medium. Such known apparatus is disclosed, for example, in U.S. Pat. Nos. 4,367,925 and 4,386,827. As disclosed in these references, the light beam enters a block of electro-optic crystal through a side face thereof, reflects off the base, and exits through the opposite side face. The base of the crystal supports a linear array of closely-spaced and parallel electrodes. Each pair of adjacent electrodes defines one pixel of information. When a voltage is applied between adjacent electrode pairs, fringing electric fields are established within the crystal. Such fields act to selectively alter the refractive index of the crystal, resulting in a phase change in that portion of the phase front of the collimated beam passing through the affected area. Schlieren optics are used to convert the phase-front modulated beam into a corresponding intensity-modulated pixel pattern representing an entire line of image information. By imaging such pattern onto a moving photosensitive recording element while periodically addressing, in parallel, all electrode pairs in the array with line information, a two-dimensional image is produced. Typically, the electrodes and their spacings measure from 1 to 30 microns in width, and it is possible to produce images having over 5000 resolvable pixels per line.

In order for the above-mentioned electro-optic scanning apparatus to produce high quality images, it is necessary that the light-modulating fringing electric fields produced between adjacent electrode pairs deeply penetrate the crystal and be highly uniform across the entire array. Such penetration and uniformity requires a good coupling between each electrode and the underlying portion of the crystal. To achieve such coupling, special care must be taken to polish the crystal surfaces, and special devices, such as elastomeric pads, are commonly used for biasing the electrodes against the crystal. However, even with such polishing and resilient biasing structures, it is difficult to obtain the necessary uniformity in the electric fields to assure that scan-line image quality is not degraded. Other disadvantages associated with the above scanning apparatus are: (1) the relatively large electro-optic crystals required by such scanners are costly to produce and, (2) owing to the need to create relatively deeply penetrating fringing electric fields within the crystal, relatively high voltage must be applied between adjacent electrodes.

SUMMARY OF THE INVENTION

The present invention significantly reduces both the complexity and cost of scanning devices of the type described and, improves the uniformity of the phase-altering electric fields created within the electro-optic medium thereby improving the quality of the resulting optical image. This is achieved by an integrated electro-optic scanning device which is capable of scanning an entire line of image information in the form of pixels across a recording medium. A preferred embodiment of such a scanning device comprises: a base support; a planar electrode layer disposed on a surface of such base support; a first buffer layer comprising a transparent layer of dielectric material disposed atop the planar electrode; and a planar, polymeric optical waveguide disposed atop the buffer layer. The polymeric waveguide comprises a Langmuir-Blodgett thin film of poled, optically-transparent, electro-optic polymer material which is adapted to transmit therethrough, by multiple total internal reflections, (i.e. waveguiding), a sheet-like beam of collimated light. A second buffer layer comprising a transparent dielectric material is disposed atop the polymeric waveguide layer, and a plurality of spaced parallel electrodes, each defining a pixel of line information, are disposed atop the second buffer layer. Preferably the spaced parallel electrodes are formed by a photo-lithographic technique from a planar electrode. In use, an electric field is selectively provided between each of the spaced, parallel electrodes and the planar electrode on the opposite side of the polymeric film to produce a change in refractive index through selected portions of the interposed electro-optic polymer film. Such change in refractive index acts to modulate the phase front of collimated light passing through such selected portions in accordance with pixel image information to be recorded. Optical means are provided within the integrated waveguide structure for converting the phase-modulated wave front of the propagating beam to an intensity-modulated pixel pattern which can be imaged upon the surface of a light-sensitive recording medium.

By substituting an electro-optic polymer thin film for the electro-optic crystal which characterizes the prior art devices, certain technical advantages result. For example, because the Langmuir-Blodgett materials can be deposited on a substrate by dip-coating and other poled polymeric materials can be deposited by spin-coating or other similar techniques, it is possible to provide a fully integrated, monolithic structure comprising a plurality of thin films deposited on a supporting substrate. In such an integrated structure, the aforementioned difficulty of providing good electrical coupling between the pixel electrodes and the electro-optic material is eliminated. Because the polymer precisely conforms to its supporting surface, any non-uniformity in the phase-front-modulating electric fields caused by geometrical variations at the crystal/electrode interface is eliminated. Also, in an integrated structure, the need for fringing electric fields is eliminated since the pixel electrodes and ground electrodes can be arranged on opposite sides of the electro-optic polymer layer. This arrangement also allows lower voltages to be used in the creation of the phase-front modulating fields.

Other aspects, objects, features and advantages of the present invention will be more clearly understood and appreciated from a review of the following detailed description of the preferred embodiments and appended claims, and by reference to the accompanying drawings.

DETAILED DESCRIPTION OF THE PREFERRED EMBODIMENTS

Figure 1:
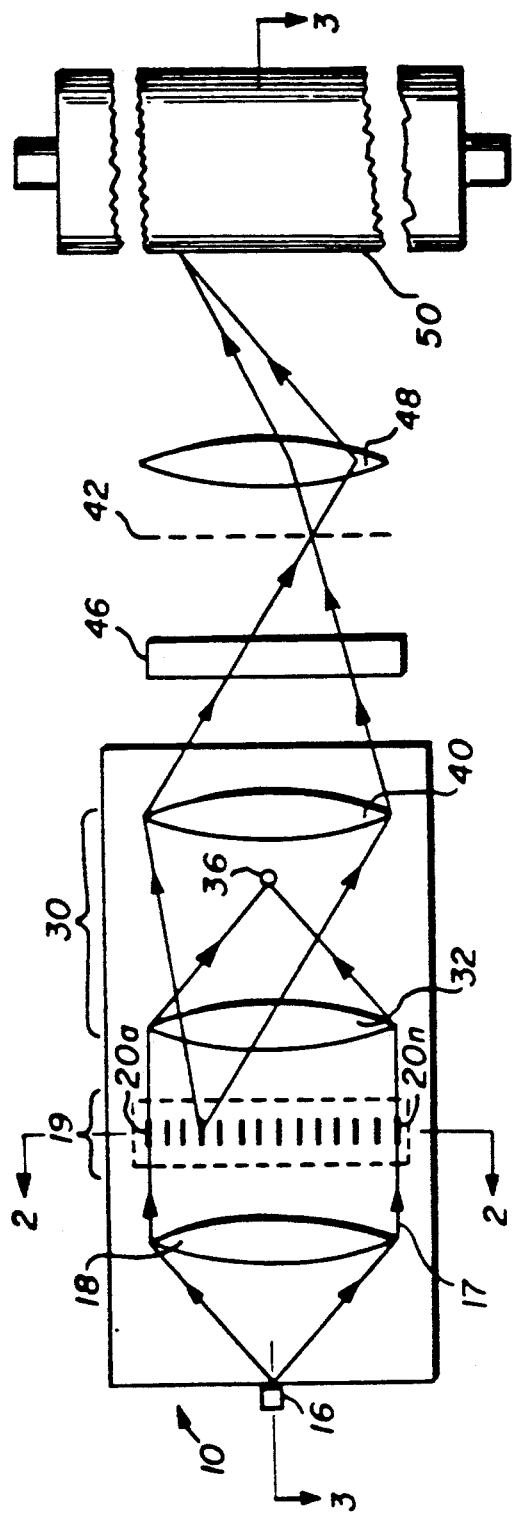
FIG. 1 is a schematic plan view of the primary optical components of a fully-integrated electro-optic device according to the invention.
Figure 2:
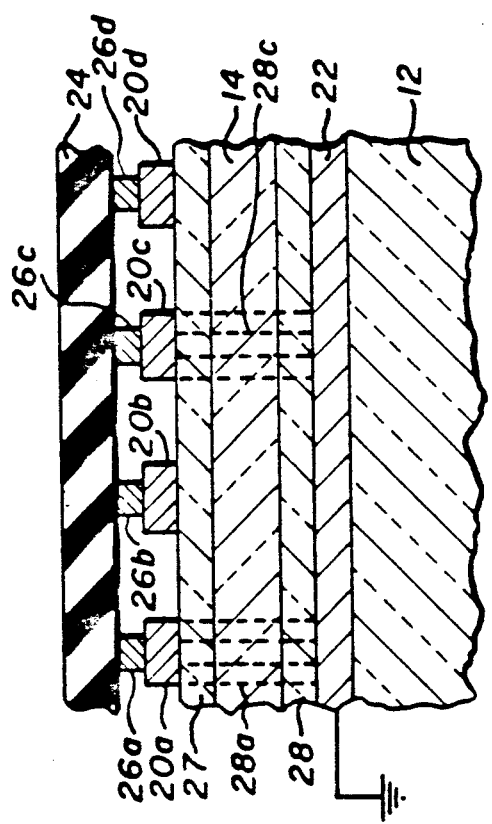
FIG. 2 is a greatly enlarged cross-section of a portion of the electrode area of the integrated device of FIG. 1, being viewed in the direction of section line 2—2 in FIG. 1.
Figure 3:
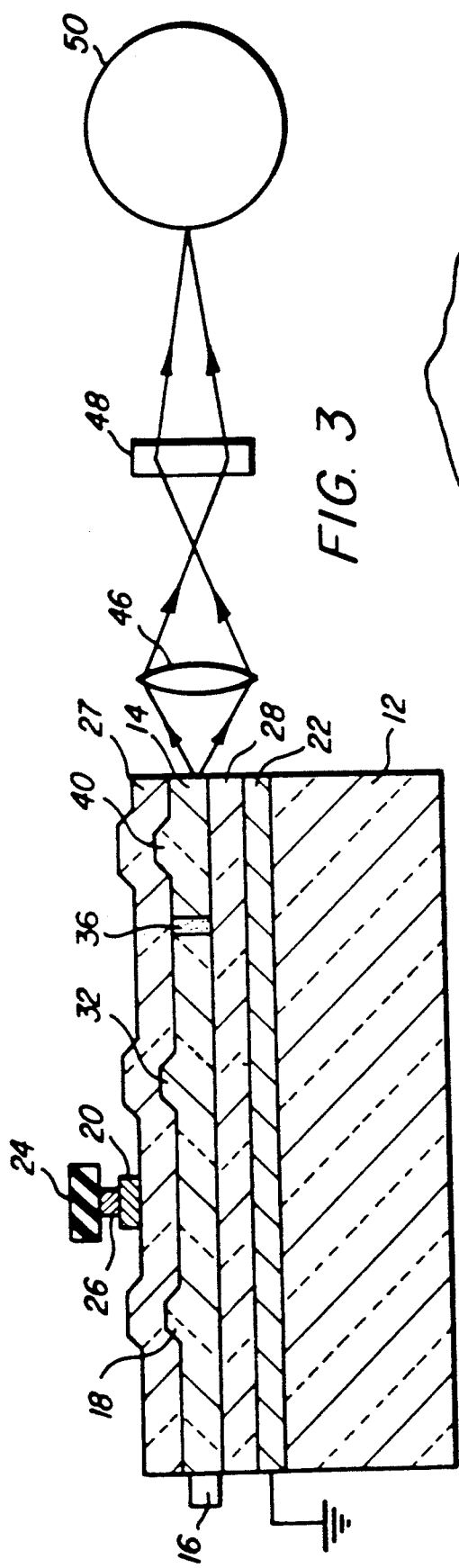
FIG. 3 is an enlarged cross section of the FIG. 1 device taken along the section line 3—3 in FIG. 1.

Referring to FIGS. 1-3, a preferred embodiment of a fully-integrated electro-optic page-scanning device 10 comprises a substrate 12 of glass or silicon having a thickness between 2 and 10 mm. Substrate 12 supports an optical waveguide in the form of a thin (e.g. 0.5 to 3 microns thick) film 14 of a poled, optically transparent, electro-optic polymer material. Suitable electro-optic polymers are those which exhibit a high second order polarization susceptibility, such as the polymers disclosed in the commonly-assigned U.S. Pat. Nos. 4,792,208, 4,948,225, and 4,955,977, the disclosures of which are incorporated herein by reference. A laser diode 16, butt-coupled to one edge of the polymer film, serves as a source of a sheet-like light beam 17 which is guided in the plane of the waveguide film 14 by total internal reflection. It is not necessary, of course, that the light source be in the form of laser diode 16, or that the light source be directly coupled to polymer film 14. Instead, beam 17 may be generated by a remote laser source having an output beam which is optically coupled to the film by a conventional grating or prism coupler, as shown in the above-referenced patents.

Waveguide lens 18 (e.g. a mode-index, geodesic, Fresnel or Luneberg lens) collimates the sheet-like beam 17 and directs it through a beam-modulating area 19 in which the electro-optic polymer material 14 is sandwiched between a plurality of closely-spaced upper electrodes 20a-20n, each being electrically addressable with a pixel of image information, and a lower planar electrode layer 22 which acts as an electrical ground plate.

Preferably, the pixel electrodes 20a-20n and the opposing planar electrode 22 have a thickness between 0.5 and 5 microns and are spaced from the electro-optic polymer film by buffer layers, 27 and 28, respectively. These buffer layers comprise thin films (e.g. 0.5 to 5 microns thick) optically transparent dielectric materials (e.g. silicon dioxide or polymethyl-methacrylate) having a refractive index which is somewhat lower than that of the polymer waveguide. The lower refractive index promotes total internal reflection of beam 17 within the waveguide and thereby prevents the absorption of light propagating within the waveguide by the electrode structure. Note, buffer layer 28 could be eliminated if the adjacent planar electrode 22 is sufficiently transparent and exhibits a suitably low refractive index. Such a transparent electrode could be indium tin oxide (ITO).

Figure 4B:
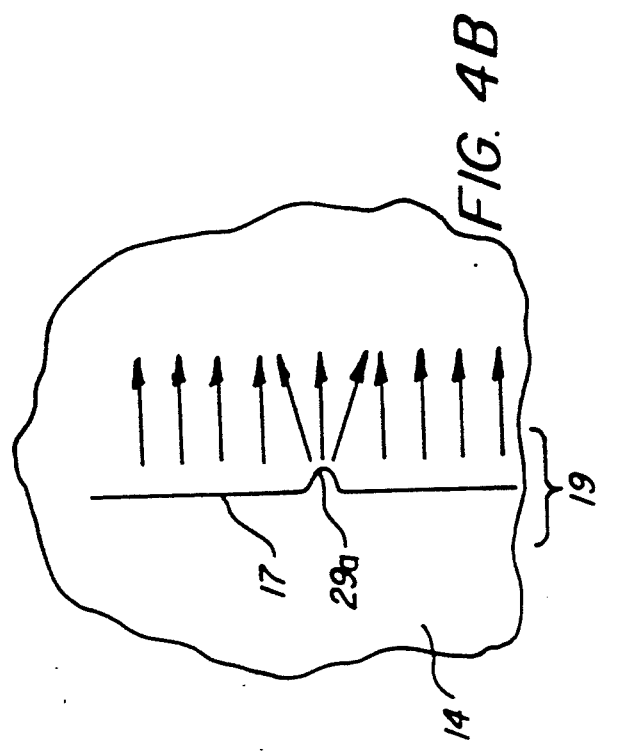
FIG. 4B is a schematic diagram similar to FIG. 4A showing a phase front being modified by an electric field formed in the same beam-modulating area.
Figure 4A:
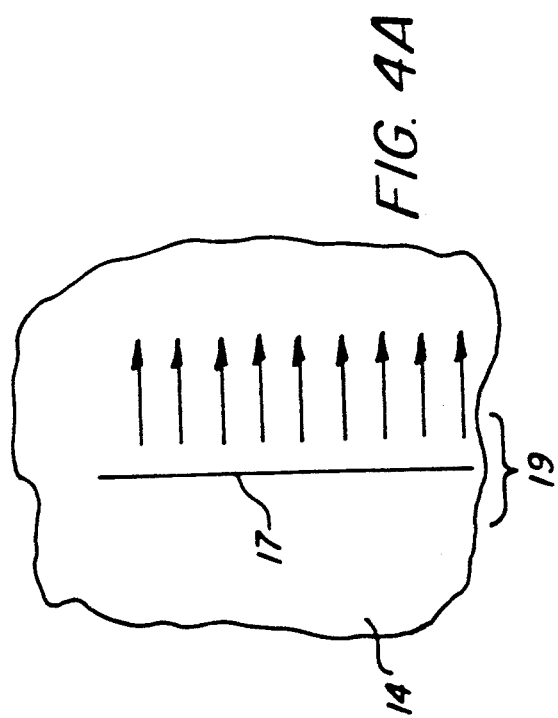
FIG. 4A is a schematic diagram showing a uniform phase front of collimated light traveling through a portion of the beam-modulating area of the device of FIG. 1.

Electrical addressing of the individual upper electrodes 20a-20n is achieved by well-known electronic circuitry incorporated in a LSI silicon driver chip 24 (FIG. 2) having electrical conductors 26a-26n which are suitably placed in contact with upper electrodes 20a-20n. Suitable addressing circuitry is disclosed in U.S. Pat. No. 4,386,827. When none of the pixel electrodes are addressed (i.e. no voltage is applied), the sheet of light passes through region 19 as a plane wave, as shown in FIG. 4A. When the electronic driver circuit selectively applies a voltage to certain pixel electrodes (e.g., electrodes 20a and 20C in FIG. 2), discrete electric fields 28a and 28c are produced across the thickness of the polymer film, within modulating area 19. The presence of such an electric field changes the index of refraction in the electro-optic polymer (by means of the well-known Pockels effect) resulting in perturbations in the uniform phase front of collimated light beam 17. Each perturbed portion 29a on the phase front acts as a diffracting spot which, as illustrated in FIG. 4B, behaves as a point source of light.

Referring again to FIG. 1, Schlieren optics 30, which are also integrated within the waveguide structure in the form of mode-index or Luneberg optical elements, function to convert the phase-front-modulated light beam into a linear, intensity-modulated pixel pattern. The Schlieren optics comprises a lens 32 which focuses all of the non-diffracted light to an opaque light-absorbing stop 36, and lens 40 which focuses the light diffracted around stop 36 at an image plane 42, outside the integrated structure. Each of the pixel regions where the phase front has been disturbed appears as an illuminated pixel at image plane 42. Cylinder lens 46 collects light exiting from the waveguide structure and focuses it to a line image at image plane 42. Spherical lens 48 projects and magnifies the image of the linear pixel pattern onto a photosensitive surface, such as the photoconductive surface of electrophotographic drum 50. As such drum rotates, electrodes 20a-20n are periodically addressed, in parallel, with line information, thereby recording a two-dimensional (page) of image information on the drum surface.

The above-described monolithic structure can be manufactured by a series of conventional thin-film deposition techniques. First, the planar electrode 22 is formed atop substrate 12 by vapor or sputter depositing a metallic material (e.g. aluminum) to the desired thickness (0.5 to 5 microns). Buffer layer 28 is then formed atop the planar electrode 22 (at least in the light-modulating region 19). The manner in which buffer layer 28 is formed depends upon the material. When the buffer layer is polymethylmethacrylate (PMMA), it can be formed by a spin-coating technique; when it is silicon dioxide, it can be reactively sputtered. The polymer waveguide layer 14 is then spin-coated or dip-coated on the buffer layer 28 to the desired thickness (0.5 to 3 microns). At this point, a small hole (e.g. 0.5 to 5 microns in diameter) is milled in the waveguide at the location of stop 36. A light-absorbing dye is deposited in the hole to provide the light-stopping function. Lens 18, 32 and 40 are then formed atop the waveguide, such as by the process disclosed in commonly assigned U.S. patent application Ser. No. 377,699 filed Jul. 10, 1989 by J. C. Brazas. A second buffer-layer 27 is formed atop the polymer layer, at least in region 19, in the same manner as buffer layer 28 is formed. Thereafter, a metal film (e.g. aluminum) is vapor- or sputter-deposited atop buffer layer 27 to a thickness of from 0.5 to 5 microns. This film, together with planar electrode 22, is used in the polymer-poling process in which a high voltage is applied across the polymer film while the polymer is heated to a high temperature. The uniform electric field produced by such voltage serves to align the polymer's molecular dipoles in a direction parallel to the applied field. With the electric fields still applied, the polymer layer is allowed to cool to room temperature, after which the voltage is removed and the dipoles are 'frozen' in alignment, perpendicular to the plane of the polymer layer. After poling of the polymer layer, ion-milling or chemical etching is used to photolithographically delineate the pixel electrodes 20a–20n in the last-deposited metal film.

The above-described manufacturing process very effectively and uniformly bonds the electrode structure with the intervening electro-optic polymer and buffer layers. This bonding eliminates the prior art problem of nonuniformity between the electrodes and the surfaces of the electro-optic crystal material. As a result, considerably stronger and more consistent electric fields can be achieved in the phase-modifying area 19 of polymer film 14, resulting in improved pixel quality in the scan line output.

Figure 5:
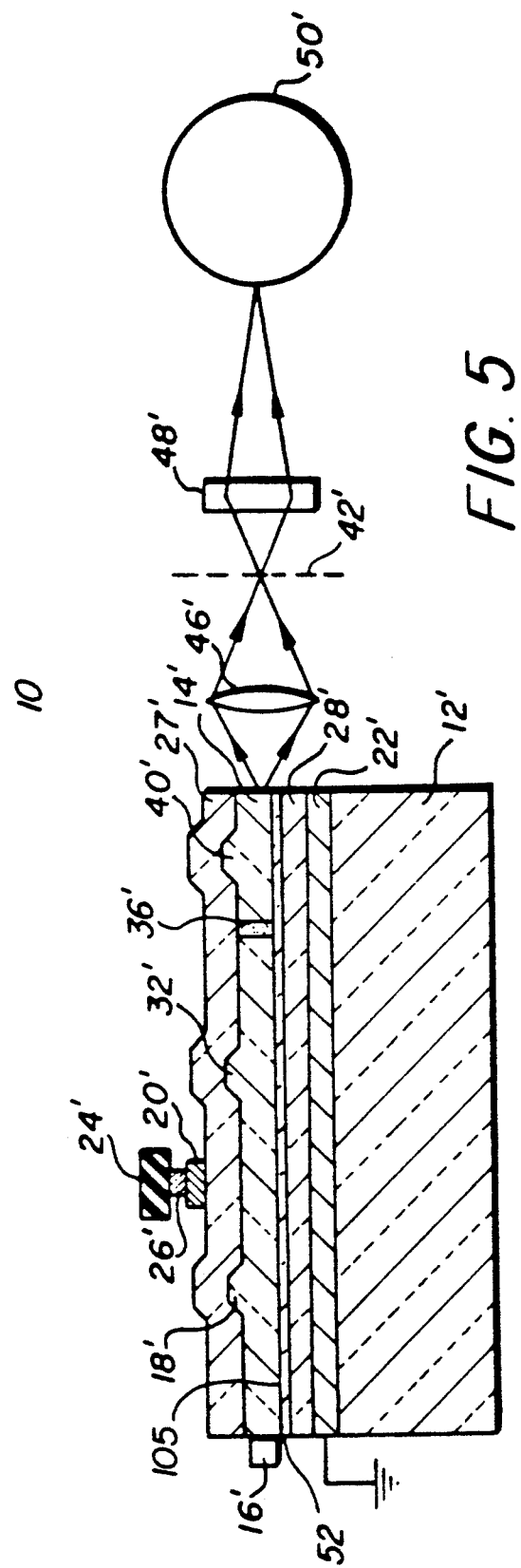
FIG. 5 is an enlarged cross-sectional view similar to FIG. 3, but illustrating another preferred embodiment using a Langmuir Blodgett thin film for the electro-optic polymer.

Referring now to FIG. 5, another preferred embodiment of an electro-optic page scanner is shown wherein the nonlinear optical waveguide is formed, at least partially, by a Langmuir-Blodgett film. Briefly, light emitted by laser diode 16' is endfire coupled into the waveguide scanner 10' and collimated by mode index lens 18'. The waveguide layer 14' is a Langmuir-Blodgett film having a thickness of about 0.05 to 1.0 $\mu$m. The L-B film 14' is bounded on either side by transparent, low index, buffer layers 27', 28' that have a thickness of about 1.0 to 10.0 $\mu$m. Where the L-B film cannot be made thick enough to support a single guided optical mode, it may be necessary to deposit an additional layer 52 of transparent, high index material on top of the lower buffer layer 28' before the L-B film 14' is coated. The index of refraction of the additional layer 52 should be approximately equal to the index of refraction of the L-B film 14'. The film 14' is formed so that the noncentro-symmetric molecules that comprise the film are oriented in the same direction; the film is automatically poled. The axis of alignment for the molecules should be perpendicular to the plane of the waveguide. Layer 52 is selected for its ability to support an L-B film on its major surface 105. Major surface 105 can be either hydrophilic or lipophilic.

An electric field can be applied across localized regions of the electro-optic film 14' by a ground electrode plane 22' beneath the lower buffer layer 28', and an array of individually addressable electrode fingers 20' located above the upper buffer layer 27'. Light passing beneath electrode fingers that are energized causes phase front retardation in those portions of the guided collimated beam passing beneath those electrodes. This phase front distortion is converted to an intensity modulation across the beam at image plane 42' by means of Schlieren optics (i.e., waveguide lenses 32' and 40' and stop 36'). This intensity pattern is then transferred, and magnified if necessary, to the photosensitive medium 50' by transfer lens 48'.

A principal advantage of the current poled polymer or L-B electro-optic waveguide page scanning device over prior bulk optic devices is that lower drive voltages can be used to energize the individual pixels and the resultant electric fields are far more uniform. The lower voltage drive is possible because there is better overlap between the electric field applied across the thin poled polymer or L-B film and the light guided in the film, and the electro-optic coefficient of the organic material of the film can be made larger than that of other electro-optic materials. The improved field uniformity is possible because the electric field is applied between closely spaced plate-like electrodes above and below the poled polymer or L-B film instead of being applied as a fringing field between adjacent fingers on the surface of a bulk crystal of inorganic electro-optic material. Another advantage is the device can be much more compact and less expensive. Further, the organic waveguide material does not suffer optical damage which is known to limit the usefulness of some materials, especially at high optical power densities.

A principal advantage of the current L-B electro-optic waveguide page scanning device over prior devices is that the L-B material can be coated on a variety of substrates, and the L-B films do not require electrical poling.

A preferred embodiment of the present invention uses Langmuir-Blodgett layers as described below as the nonlinear optical material. Portions of the detailed description of copending application Ser. No. 07/735,550, filed Jul. 25, 1991 are incorporated hereinbelow. The construction of an optical article for precisely modulating the phasefront of a guided wave places stringent requirements on the nonlinear optical layer:

(a) The thickness of the nonlinear optical organic (NLO) layer must be at least 70 percent of the wavelength $\lambda$, the wavelength of light in free space which, for typical applications is in the range of 1.0 $\mu$m to 300 nm.

(b) The NLO layer must be substantially transparent to $\lambda$.

(c) The NLO layer must exhibit an absolute electro-optic coefficient of at least 10

$$\frac{pm}{V}.$$

(d) The NLO layer must incorporate molecular dipoles which have the same polarity. In particular, it will be appreciated that with polarization of the electromagnetic radiation so that the electric field is perpendicular to the major surface 105 in FIG. 2 (i.e., TM polarization) a more efficient interaction with the dipole of the L-B film is possible.

Taking all of the above factors into consideration, Langmuir-Blodgett film assemblies have been selected to satisfy the requirements of the optical articles of the present invention.

The molecules used to construct L-B films are amphiphiles; that is, compounds that contain at least one hydrophilic moiety (Hy), also commonly referred to as a head group, and at least one lipophilic moiety (L), also commonly referred to as a tail group, joined through a linking group (K). The first mono-molecular amphiphile layer deposited on the support surface 105 takes one of two possible orientations, depending upon whether the support surface is hydrophilic or lipophilic:

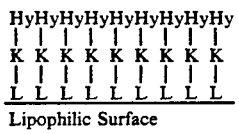

Lipophilic Surface (4a)

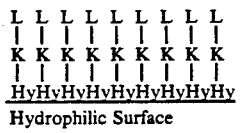

Hydrophilic Surface (4b)

To achieve high second order polarizabilities, $\chi^{(2)} > 10^{-9}$ esu, it is necessary that a high proportion of the amphiphile layers used to construct the L-B assemblies contain a molecular dipole linking group (M). For a linking group to be considered a molecular dipole linking group its second order polarizability, $\beta$, must be greater than $10^{-30}$ electrostatic units (esu). The following reflects the inclusion of a molecular dipole:

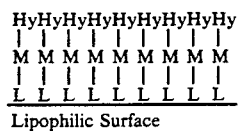

Lipophilic Surface (5a)

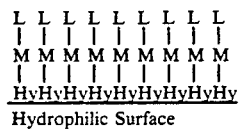

Hydrophilic Surface (5b)

Each molecular dipole in turn is comprised of at least one electron donor (D), at least one electron acceptor (A) and a linking group (E), specifically a conjugated $\pi$ bonding system, which provides a pathway for charge transfer resonance between A and D:

(6)

Taking into account the orientation of the molecular dipole M in the amphilphile, relationships 5a and 5b can be expanded into four relationships:

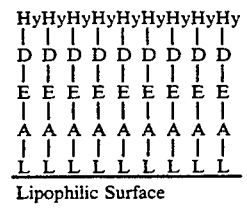

Lipophilic Surface (7a)

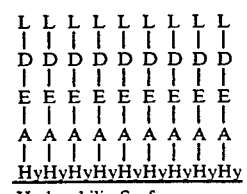

Hydrophilic Surface (7b)

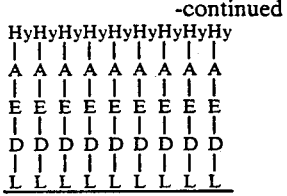

Lipophilic Surface (7c)

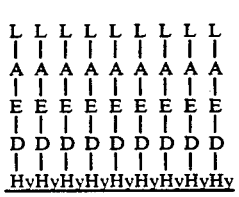

Hydrophilic Surface (7d)

Although the amphiphiles have been shown above as monomeric compounds, it is appreciated that the amphiphiles can be repeating units in a polymer, where the backbone of the polymer serves as the hydrophilic moiety Hy or the lipophilic moiety L. The following reflects polymeric linkage (—) of the amphiphiles:

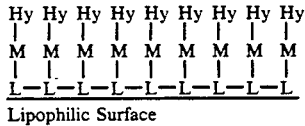

Lipophilic Surface (8a)

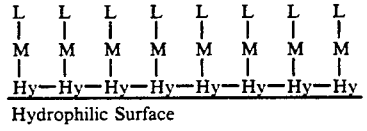

Hydrophilic Surface (8b)

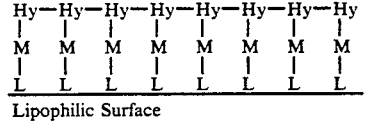

Lipophilic Surface (8c)

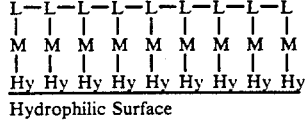

Hydrophilic Surface (8d)

It is also possible to employ as spacer layers polymeric amphiphiles which do not include molecular dipoles. It has been observed that higher levels of stability can be realized when one or more recurring amphiphile layers in an L-B layer unit are constructed using polymeric amphiphiles.

In the foregoing description only a single amphiphile layer is shown on a support. To satisfy the organic layer unit thicknesses required for the optical articles of the invention a large number of superimposed amphiphile monolayers are required. Multilayer L-B assemblies are characterized as X, Y or Z type assemblies, depending on the relative orientations of the amphiphile layers. In a Z type assembly the first amphiphile layer is oriented with the hydrophilic moiety nearest the support as shown at 4b, 5b, 7b, 7d, 8b and 8d above. The next and all subsequent amphiphile layers are deposited in the same orientation as the first amphiphile layer; that is, the hydrophilic moiety Hy is nearer the support than the lipophilic moiety L in each successive layer.

X type assemblies are similar to Z type assemblies, except that the lipophilic moiety L in each amphiphile layer is nearest the support. Thus, X type assemblies are constructed starting with the initial layer arrangements shown at 4a, 5a, 7a, 7c, 8a and 8c above. The next and all subsequent amphiphile layers are deposited in the same orientation as the first amphiphile layer; that is, the lipophilic moiety L is nearer the support than the hydrophilic moiety Hy in each successive layer.

X and Z type assemblies have the appeal of structural simplicity because all successive amphiphile monomolecular layers can be identical within an L-B layer unit.

Structurally more complex Y type L-B assemblies are not only feasible in the construction of the L-B layer 14', but also produce advantages in construction and stability. In Y type L-B assemblies hydrophilic moieties are deposited on hydrophilic moieties and lipophilic moieties are deposited on lipophilic moieties:

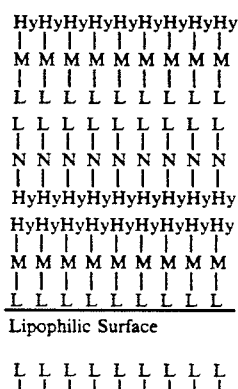
(9a)

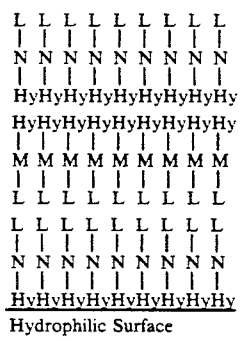
(9b)

One major advantage of Y type L-B assemblies is that they place the lipophilic moieties and hydrophilic moieties in adjacent positions in the layer sequence and thereby provide a more stable L-B assembly.

However, Y type L-B assemblies require at least two different types of amphiphiles. In one preferred form, two different amphiphiles, L-M-H and L-N-H, are required, where N represents a molecular dipole having its polarity reversed as compared with the molecular dipole M. In other words, if the molecular dipole M is oriented with its electron donor group adjacent the lipophilic moiety L, the molecular dipole N is oriented with its electron acceptor group adjacent the lipophilic moiety L, so that L-M-Hy is by expanded notation L-D-E-A-Hy while L-N-Hy is by expanded notation L-A-E-D-Hy. If the same amphiphile were employed in each successive layer, a centrosymmetric structure would result in which the contribution of the molecular dipoles in each amphiphile layer to the second order polarization susceptibility, $\pi^{(2)}$ which is directly proportional to the linear electro-optic coefficient, $r_{33}$, would be cancelled by the oppositely oriented molecular dipoles in the next adjacent layer.

An alternate Y type assembly, one that permits the use of only a single type of molecular dipole containing amphiphile, can be achieved by replacing every other amphiphile monomolecular layer with a amphiphile monomolecular spacer layer lacking a molecular dipole. The spacer amphiphiles can be identical to the amphiphiles containing molecular dipoles, except that the molecular dipole M or N is replaced by linking group (S) which exhibits a second order polarizability of less than $10^{-30}$ esu. In this arrangement the following layer sequences can be employed:

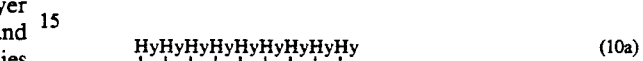
(10a)
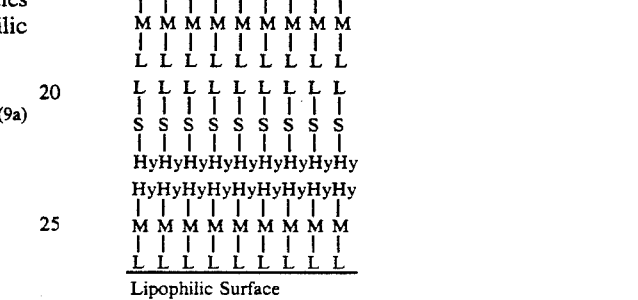
Lipophilic Surface

(10b)
Hydrophilic Surface

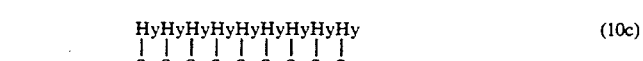
(10c)
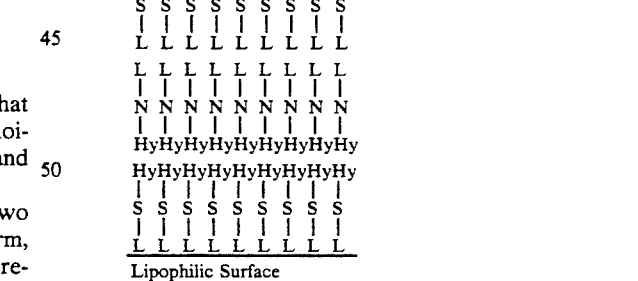
Lipophilic Surface

(10d)
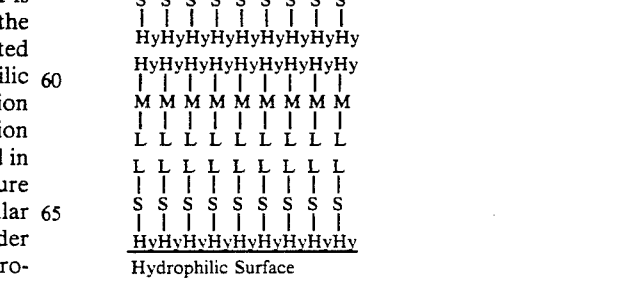
Hydrophilic Surface

In 9a and 9b each of the amphiphiles L-M-Hy and L-N-Hy must be capable of depositing on the other. This involves preparing an amphiphile that, in addition to exhibiting the high second order polarizability $\beta$ desired, also performs well as an L-B amphiphile in forming successive monomolecular layers. It is apparent that this requires amphiphile selection to be based on an acceptable balance of the ability of the amphiphile to perform two entirely different functions. It has been observed that amphiphiles having high $\beta$ values can perform entirely satisfactorily as deposition surfaces for other amphiphiles or when deposited on other amphiphiles, but lack the adherency required for deposition on themselves or similar amphiphiles. By having freedom to select the amphiphiles L-S-Hy in 10a–d lacking high values from a wide range of known amphiphiles strictly on the basis of their desirability in terms of L-B layer construction capabilities, the advantage can be realized of achieving higher deposition efficiencies and hence more uniform and stable L-B assemblies. Since spacer moiety S of the L-S-Hy amphiphiles can be relatively small in relation to the molecular dipoles M and N in the L-M-Hy and L-N-Hy amphiphiles, any reduction in the value of $\chi^{(2)}$ attributable to the presence of spacer amphiphiles can be kept to a relatively low level.

In the foregoing discussion three successive amphiphile monolayer repeating units have been shown, 10 which is the minimum number required to show the layer sequence. In practice many more successive layers are required to complete each of the L-B layer units.

The amphiphiles used to form the L-B layer units can be made up of hydrophilic moieties (head groups) Hy, lipophilic moieties (tail groups) L and linking groups K, including both spacer groups S and molecular dipoles M, that take a variety of different forms.

The following are illustrative of amphiphiles with varied hydrophilic moieties serving as head groups:

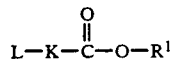 (H-1)

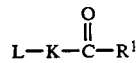 (H-2)

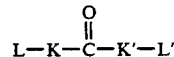 (H-3)

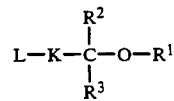 (H-4)

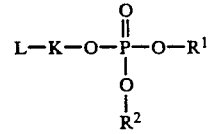 (H-5)

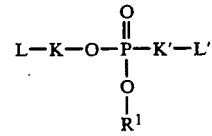 (H-6)

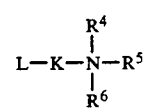 (H-7)

-continued

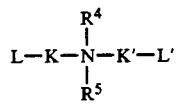 (H-8)

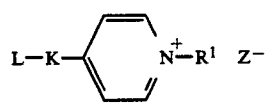 (H-9)

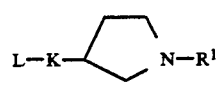 (H-10)

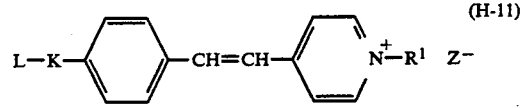 (H-11)

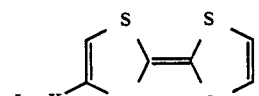 (H-12)

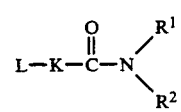 (H-13)

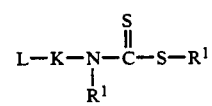 (H-14)

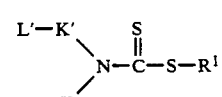 (H-15)

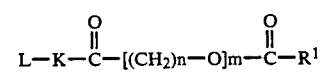 (H-16)

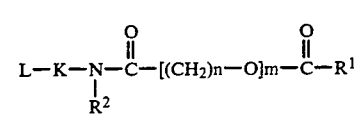 (H-17)

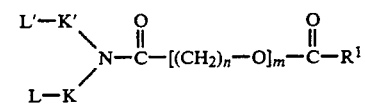 (H-18)

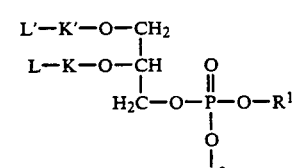 (H-19)

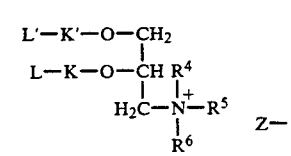 (H-20)

where

K and K' represent independently selected linking moieties;

L and L' represent independently selected lipophilic moieties;

m is an integer of from 1 to 20, preferably 1 to 10 and optimally from 1 to 6; n is an integer of from 1 to 6, preferably from 1 to 3 and optimally 2;

$R^1$, $R^2$ and $R^3$ are independently hydrogen or any synthetically convenient hydrocarbon or substituted hydrocarbon compatible with the desired hydrophilic character of the head group, these groups, when hydrocarbons, preferably being alkyl of from 1 to 10 carbon atoms, most preferably 1 to 5 carbon atoms. The alkyl groups can be substituted with common modifying groups, such as aryl, halo, hydroxy, alkoxy, and aryloxy moieties, where the alkyl moieties preferably contain from 1 to 3 carbon atoms and the aryl moieties contain from 6 to 10 carbon atoms (e.g., phenyl or naphthyl moieties);

$R^4$, $R^5$ and $R^6$ independently represent any of the same hydrocarbon or substituted hydrocarbon groups as $R^1$ and $R^2$ or any two together represent carbon and optionally oxygen atoms completing a 4 to 7 member ring (e.g., an azetidine, pyrrole, pyrroline, pyrrolidine, morpholine or azepine ring); and Z represents a counter ion.

In addition to the simple head groups shown above it is additionally contemplated to employ head groups that are capable also as acting the electron acceptor, indicated by the prefix HA, or electron donor, indicated by the prefix HD, of the organic molecular dipole. The following are illustrative of such groups:

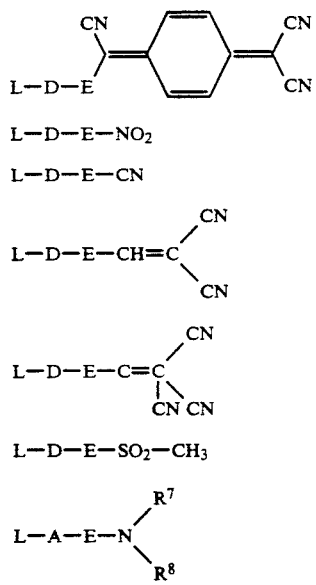

where $R^7$ and $R^8$ are independently hydrogen, hydrocarbon or substituted hydrocarbon selected similarly as $R^1$ and $R^2$.

The lipophilic moieties or tail groups L are nonpolar groups. Depending upon the group to which the lipophilic moiety is attached, an alkyl group of from 1 to 3 carbon atoms (e.g., a methyl, ethyl or propyl group) can function effectively as a lipophilic moiety. Preferred lipophilic moieties are hydrocarbons that contain a least four carbon atoms, including alkyl, cycloalkyl, alkenyl groups, cycloalkenyl, aryl, alkaryl, and aralkyl moieties. To avoid excessive bulk the hydrocarbon lipophilic moieties are preferably limited to 24 or fewer carbon atoms. Alkyl and alkenyl groups of from about 4 to 20 carbon atoms are preferred. Aryl groups, such as phenyl, naphthyl and biphenyl, are specifically contemplated. Preferred cycloalkyl groups are those that contain from 5 to 7 ring carbon atoms. Halogen substitution of the hydrocarbons is recognized to increase their lipophilic properties. Fluoro-substituted hydrocarbons are specifically recognized to be highly lipophilic.

When the first and second amphiphiles are polymers and the repeating units of at least one of the amphiphile polymers contains a branched lipophilic moiety L of up to 9 carbon atoms, the optical attenuation within the organic layer unit formed by the Y type L-B assembly is exceedingly low. Specifically, optical attenuation levels are reduced to less than 2 dB/cm. It is preferred that both of the lipophilic moieties be formed of a branched hydrocarbon of 9 or fewer carbon atoms, particularly when each of the polymeric amphiphiles forming the Y type L-B assembly contains an organic molecular dipole moiety. In a specifically preferred form the branched lipophilic moiety exhibits the structure:

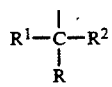 (12)

where R is hydrogen or a hydrocarbon and $R^1$ and $R^2$ represent separate hydrocarbons or together complete a cyclic hydrocarbon.

The branched lipophilic moiety can be chosen from among 2-propyl, 2-butyl, 2-(2-methylpropyl), 2-(2-methyl-butyl), 2-(2-ethylbutyl), 2-(3-methylbutyl), 2-pentyl, 2-(2-methylpentyl), 2-(3-methylpentyl), 3-pentyl, 3-(2,4-dimethylpentyl), 3-(3-ethylpentyl), 2-hexyl, 2-(2-methylhexyl), 2-(3-methylhexyl), 2-(4-methylhexyl), 2-(3-ethylhexyl), 2-(4-ethylhexyl ), 2-heptyl, 4-heptyl, 4-(3-ethylheptyl), cyclopentyl, cyclohexyl, phenyl, tolyl, xylyl, ethylphenyl, norboranyl or similar cyclic and acylic branched hydrocarbons. As noted above, corresponding halohydrocarbon and halocarbon lipophilic moieties are even more lipophilic.

When the linking groups K function merely to provide a synthetically convenient linkage between the hydrophilic moieties Hy and the lipophilic moieties L, as in the amphiphiles Hy-S-L, they can take a wide variety of forms. While the Hy and L moieties are relied upon primarily to provide ambiphilic properties, linking groups are seldom entirely neutral moieties. When the linking group is a divalent hydrocarbon moiety, the demarcation between the linking group and lipophilic moiety is, of course, arbitrary. In other instances the linking group can contain one or more polar moieties, making it hydrophilic to some degree; however, the linking group is normally chosen to be less hydrophilic than the hydrophilic moiety Hy with which it is employed. When the linking moiety contains a hydrophilic or lipophilic portion, that portion is preferably attached to the hydrophilic or lipophilic moiety, so that it supplements the hydrophilic or lipophilic moiety in providing the desired ambiphilic properties to the molecule.

The following are representative of linking groups:

 (K-1)

where n is an integer of from 1 to 24, preferably from 4 to 20;

$$-(CH_2)_n-Z- \quad (K\text{-}2)$$

where n satisfies the K-1 definition and Z is a divalent oxy, —O—, thio —S— or amino —N(R1)— linkage with $R^1$ satisfying the definition above;

$$\begin{array}{c} Z^1 \\ \| \\ -C- \end{array} \quad (K\text{-}3)$$

where $Z^1$ represents an oxo, =O, or thione, =S, atom;

$$-(CH_2)_l-(CH=CH)_m-(CH_n)- \quad (K\text{-}4)$$

where l, m and n are each integers of from 4 to 20, with l+m+n preferably being no more than 20;

$$-(CH2)_m-C\equiv C-C\equiv C-(CH2)_n- \quad (K\text{-}5)$$

where m and n are each integers of from 4 to 20, with m+n preferably being from 10 to 20;

(K-6) [phenyl]-(CH=CH)ₙ— where n is an integer of from 1 to 10, preferably from 1 to 4;

(K-7) —(CH=CH)ₘ—[phenyl]—(CH=CH)ₙ— where m and n are each integers of from 1 to 10, preferably from 1 to 4;

(K-8) [phenyl]—(CH=CH)ₙ—C(=O)— where n is an integer of from 1 to 10, preferably from 1 to 4;

(K-9) —C(=O)—(CH=CH)ₘ—[phenyl]—(CH=CH)ₙ—C(=O)— where m and n are each integers of from 1 to 10, preferably from 1 to 4;

(K-10) [phenyl]ₘ where m is an integer of from 1 to 5, preferably 1 or 2;

(K-11) [phenyl]—O—

(K-12) [[phenyl]]ₘ—[phenyl]—O— where m is an integer of from 1 to 5, preferably 1 or 2.

When the amphiphile contains an organic molecular dipole, —M—, the overall structure of the amphiphile can be represented as Hy-A-E-D-L or Hy-D-E-A-L. In the majority of instances the electron acceptor moiety is itself sufficiently hydrophilic to be employed as a head group. Thus, the preferred electron acceptor moieties for forming the Hy-A-E-D-L amphiphiles are those described above identified by the prefix HA. An amine structure, HD-26, is shown above capable of acting as both a donor and a head group; however, electron donor moieties are in general not strongly hydrophilic moieties. When employed to form an Hy-D-E-A-L amphiphile, the electron donor moiety D is preferably employed with one of the preferred hydrophilic groups identified above by the prefix H. In addition to amines, exemplary electron donor moieties contemplated include oxy, —O—, and thio, —S—, moieties directly linked to a carbon atom of E and a carbon atom of Hy or L. The amine structure of HD-26, above can be converted to a L-D-structure by replacing one or both of $R^1$ and $R^2$ with a more lipophilic group L of the type described above.

The electron acceptor —SO₂— particularly lends itself to forming Hy-D-E-A-L amphiphiles, since, unlike the other electron acceptors listed above, it lends itself to -A-L structures, such as $$H\text{-}D\text{-}E\text{-}SO_2R^9 \quad (S\text{-}1)$$

where $R^9$ is $T^1$ or $T^2$.

$T^1$ can be a multicarbon atom hydrocarbon or substituted hydrocarbon of the type described above for use as L groups, preferably those containing at least 5 carbon atoms and optimally at least 10 carbon atoms.

$T^2$ requires a difluoro-substituted carbon atom attached to the sulfonyl, —SO₂—, moiety-that is, the a carbon atom. When $R^9$ takes the form of $T^2$, the structure can be represented as follows:

$$H-D-E-SO_2-\underset{F}{\overset{F}{\underset{|}{\overset{|}{C}}}}-R^{10} \quad (S\text{-}2)$$

where $R^{10}$ can be hydrogen, fluorine, or any hydrocarbon or substituted hydrocarbon described above as being useful as a lipophilic moiety, but preferably is a hydrocarbon containing less than 10 and optimally less than 5 carbon atoms.

When the a carbon atom is difluoro substituted, the second order polarizability β the molecule is enhanced. In addition the fluoro substituents markedly increase the hydrophobicity of the sulfonyl substituent. This allows the number of carbon atoms required to form the lipophilic moiety L to be reduced. For example the moiety —SO₂CH₃ has been noted above to be a hydrophilic electron acceptor moiety—i.e., an HA-moiety; but the moiety —SO₂CF₃ is a lipophilic acceptor moiety—i.e., an LA- moiety. Further the trifluormethylsulfonyl moiety is a much more efficient electron acceptor than the methylsulfonyl moiety. Additional fluoro substitutions of β and γ carbon atoms increase the lipophilic character of the moieties satisfying formula S-2, but make progressively smaller additional contributions to second order polarizability.

The linking group E between the electron donor D and electron acceptor A can take the form of a conjugated π bonding linkage of any convenient type. In the linking groups described above K-6, K-7 and K-10 provide the required conjugated p bonding linkage. The conjugated π bonding linkages of K-4, K-8, K-9 and K-12 are, of course, not useful in forming organic molecular dipoles, since the conjugation is interrupted by one or more nonconjugated linkages. This prevents resonance between an excited state and a ground state required for useful organic molecular dipoles.

In the preferred conjugated π bonding linkages E between the electron donor D and electron acceptor A moieties the terminal portions of the linkage are aromatic. In choosing a linkage E for an organic molecular dipole a number of factors must be taken into account in addition to the conjugated π bonding linkage. Increasing the length of the linkage tends to increase the dipole moment and is therefore beneficial, but this must be balanced against reducing the resonance efficiency of the organic molecular dipole, which occurs as the conjugated π bonding linkage is lengthened. In practice a balance is struck which has the net effect of achieving the highest attainable second order polarizability.

Lengthening the conjugated π bonding linkage also has the property of increasing the wavelengths of electromagnetic radiation the molecular dipole will absorb. Thus, for a specific application, the length of the conjugated π bonding linkage is limited by π as well as specific choices of the electron donor and acceptor moieties. Preferred linking groups produce molecular dipoles that are transparent to electromagnetic radiation in the near infrared and at least a portion of the visible spectra. Since the thickness of organic layer unit 14' is a function of λ, it is apparent that for organic layer units of minimum thickness (and hence minimum numbers of L-B layers) preferred organic molecular dipoles are those that are transparent to light wavelengths extending into and, preferably, throughout the blue portion of the spectrum.

The following are preferred linking groups E:

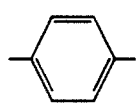
(E-1)

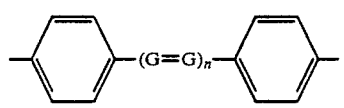
(E-2)

where G is independently in each occurrence methine or substituted methine, —CR¹¹—, or aza, —N=; R¹¹ is hydrogen or alkyl of from 1 to 3 carbon atoms; n is from 1 to 3 and optimally 1; with the further proviso that no more than two aza moieties are next adjacent.

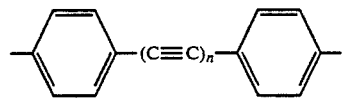
(E-3)

where n is as defined for E-2.

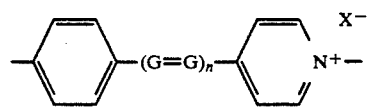
(E-4)

where G and n are as defined for E-2 and X⁻ is a counter ion.

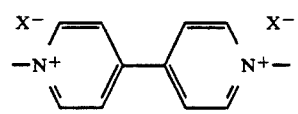
(E-5)

where X⁻ is a counter ion. O In addition to the preferred conjugated π bonding linkages E shown above that are generally useful with terminal L-A-, Hy-A-, L-D- and Hy-D-moieties of the type described above, other preferred linking groups particularly useful with sulfonyl electron acceptor moieties of the type disclosed by Ulman et al. in U.S. Pat. No. 4,792,208, the disclosure of which is herein incorporated by reference, are specifically contemplated. In the preferred linking groups E-1 to E-5 no substituents to the various aromatic rings are shown. However, any of the Rᵃ and Rᵈ ring substituents of Ulman et al. can be employed, if desired. Stilbene and diazobenzene linking groups E as well as their pyridinium analogues have been observed to provide an optimum balance of synthetic convenience and optical advantages. The following are illustrations of organic molecular dipoles of employing these types of linking groups that have been observed to be particularly useful:

(MD-1)
4-(N-Methyl-N-octadecylamino) -4'-nitrostilbene
(MD-2)
4-(N, N-Dioctadecylamino) -4'-methylsulfonyl-stilbene
(MD-3)
4-{2-[4-(N,N-Dimethylamino)phenyl]ethenyl}-N-octadecylpyridinium chloride
(MD-4)
4-{2-[4-(N,N-Dimethylamino)phenyl]ethenyl}-N-docosanylpyridinium sulfate
(MD-5)
6-{N-methyl-N-[4-(4'-octadecylsulfonyl)stilbene]amino}hexanoic acid
(MD-6)
4-(N-Methyl-N-(3,6-dioxyoctan-8-ol) amino-4'-octadecylsulfonylstilbene Preferred L-B spacer units H-S-L are saturated and mono-unsaturated fatty acids containing from 16 to 24 carbon atoms, including hexadecanoic, octadecanoic, eicosanoic, docosanoic, 22-tricosenoic and tetradecanoic acids. Phosphates, such as [CH₃ (CH)₁₂ (CH=CH)₂C(O)O(CH₆)—O]₂P(O)OH and [CH₃ (CH)₄OC(O)CH=CH (p-C₆H₄)CH=CH)C(O)O(CH₆) —O]₂P(O)OH, are specifically contemplated for use as spacer units.

The foregoing elaboration of preferred amphiphiles has focused on monomeric structures. As noted above, it is also possible to employ polymeric amphiphiles. Polymeric amphiphiles offer advantages in layer stability. Polymers that are lipophilic in character can be transformed into amphiphiles by including one or more Hy-K- pendant groups, where the designation Hy-K- indicates the various forms of these groups described above. Similarly polymers that are hydrophilic in character can be transformed into amphilphiles by including one or more L-K- pendant groups, where the designation L-k- indicates the various forms of these groups described above.

The following are representative polymeric amphiphiles contemplated for use in forming L-B layer units:

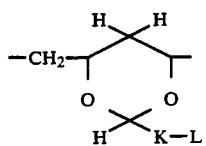
(P-1)

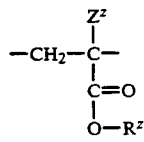
(P-2)

where $R^z$ represents -L or -K-L and $Z^z$ represents hydrogen, methyl, ethyl or cyano;

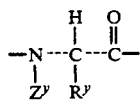
(P-3)

where $R^y$ represents -L or -K-L when $Z^y$ is hydrogen or alkyl of from 1 to 3 carbon atoms and $Z^y$ represents -L or -K-L when Ry is hydrogen or alkyl of from 1 to 3 carbon atoms;

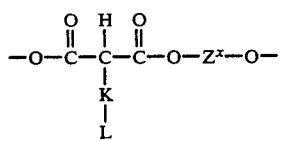
(P-4)

where $Z^x$ represents -L or -K-L when $Z^y$ is hydrogen or alkyl of from 1 to 3 carbon atoms and $Z^y$ represents -L or -K-L when Ry is hydrogen or alkyl of from 1 to 3 carbon atoms;

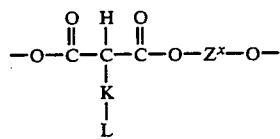
(P-4)

where $Z^x$ represents a divalent hydrocarbon containing from 1 to 12 carbon atoms (e.g., an alkanediyl, an alkenediyl, a cycloalkanediyl, phenylene, etc.);

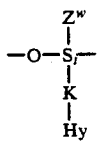
(P-5)

where $Z^w$ represents a hydrocarbon group of from 1 to 12 carbon atoms (e.g. alkyl or phenyl);

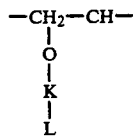
(P-6)

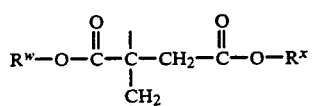
(P-7)

where one of $R^w$ and $R^x$ represents -K-L with the other being -K'-L' or any synthetically convenient lipophilic (-L) or hydrophilic (-Hy) moiety;

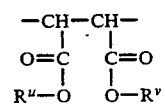
(P-8)

where one of $R^u$ and $R^v$ represents -K-L with the other being -K'-L' or any synthetically convenient lipophilic (-L) or hydrophilic (-Hy) moiety;

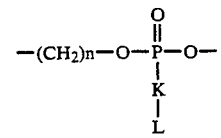
(P-9)

where n is an integer of from 2 to 4;

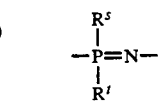
(P-10)

where one of $R^s$ and $R^t$ represents -K-L with the other being -K'-L' or any synthetically convenient lipophilic (-L) or hydrophilic (-Hy) moiety;

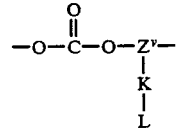
(P-11)

where $Z^v$ represents a trivalent hydrocarbon group of from 1 to 10 carbon atoms (e.g., a -K-L substituted alkanediyl or phenylene);

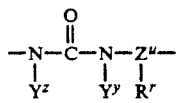 (P-12)

where at least one of $R^r$, $y^y$ and $Y^z$ is -K-L and with any of $R^r$, $Y^y$ and $Y^z$ that are not -K-L being any synthetically convenient atom or group (e.g. hydrogen or alkyl or aryl of from 1 to 10 carbon atoms) and $Z^u$ represents a trivalent hydrocarbon group of from 1 to 10 carbon atoms (e.g., a substituted alkanediyl or phenylene);

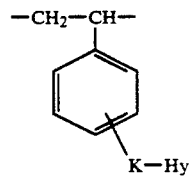 (P-13)

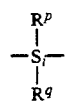 (P-14)

where at least one $R^p$ and $R^q$ is -K-H and the remaining of $R^p$ and $R^q$ is -K'-H' or any synthetic convenient lipophilic, -L, or hydrophilic, -Hy, moiety;

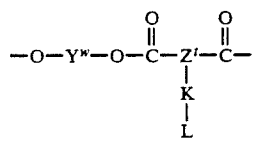 (P-15)

where $Y^w$ is a divalent hydrocarbon of from 1 to 12 carbon atoms (e.g. alkanediyl or phenylene) and $Z^t$ represents a trivalent hydrocarbon group of from 1 to 10 carbon atoms (e.g., a substituted alkanediyl or phenylene);

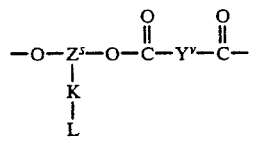 (P-16)

where $Y^v$ is a divalent hydrocarbon of from 1 to 12 carbon atoms (e.g. alkanediyl or phenylene) and $Z^s$ represents a trivalent hydrocarbon group of from 1 to 10 carbon atoms (e.g., a substituted alkanediyl or phenylene);

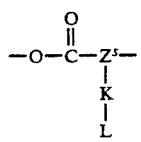 (P-17)

where $Z^s$ is as previously defined;

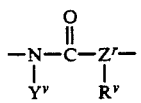 (P-18)

where $R^v$ represents -K-L when $Y^v$ is hydrogen or alkyl of from 1 to 3 carbon atoms and $Y^v$ represents -K-L when $R^v$ is hydrogen or alkyl of from 1 to 3 carbon atoms and $Z^r$ represents a trivalent hydrocarbon group of from 1 to 10 carbon atoms (e.g., a substituted alkanediyl or phenylene);

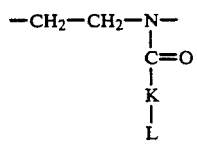 (P-19)

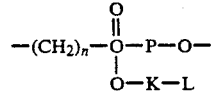 (P-20)

where n is the integer 2, 3 or 4;

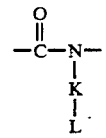 (P-21)

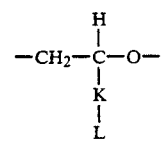 (P-22)

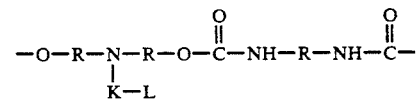 (P-23)

where R is $-(CH_2)_n-$ or $-(CH_2OCH_2)_m-$ and n and m are integers of from 1 to 6;

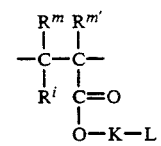 (P-24)

where $R^i$, $R^m$ and $R^{m'}$ can be independently hydrogen or any synthetically convenient hydrophilic, -Hy, or lipophilic, -L, moiety;

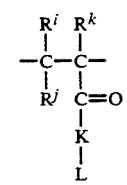 (P-25)

where $R^i$, $R^j$ and $R^k$ can be independently hydrogen or any synthetically convenient hydrophilic, -Hy, or lipophilic, -L, moiety;

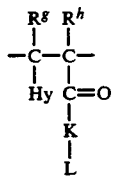
(P-26)

where $R^g$ and $R^h$ can be independently hydrogen or any synthetically convenient hydrophilic, -Hy, or lipophilic, -L, moiety;

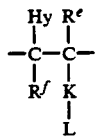
(P-27)

where $R^e$ and $R^f$ can be independently hydrogen or any synthetically convenient hydrophilic, -Hy, or lipophilic, -L, moiety;

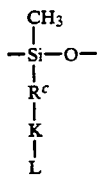
(P-28)

where $R^c$ is any synthetically convenient divalent hydrocarbon of from 1 to 12 carbon atoms (e.g., alkanediyl or phenylene).

The following are illustrative of polymers containing H-M-L repeating units linked through either the -H or -L moieties:

(PM-1)
Poly{4'-N-methyl-N-[2-(2-acryloyloxethoxy)eth-oxy]ethyl amino-4-octadecylsulfonyl azobenzene}

(PM-2)
Poly {4'-N-methyl-N-[2-(2-acryloyloxethoxy) eth-oxy]-ethylamino-4-octadecylsulfonyl azobenzene -co-2-hydroxyethyl acrylate} [1:4–6 mole ratio]

(PM-3)
Poly {4'-dioctadecylamino-4-(6-acryloyloxy) hexyl-sulfonyl azobenzene-co-2-hydroxyethyl acrylate}[1:4–6 mole ratio]

(PM-4)
Poly {4'-N-methyl-N-(8-acryloyloxy)octylamino -4-octadecylsulfonyl azobenzene-co-N,N-dimethyl acryl-amide} [1:4–6 mole ratio]

(PM-5)
Poly{N-[2-(hexamethyleneiminocarbonyloxy) ethyl]-N-[2-(iminocarbonyloxy)ethyl]-N-[4-(4'-octa-decyl-sulfonylazobenzene]amine}

The following are illustrative of polymers containing H-S-L repeating units linked through either the -H or -L moieties:

(PS-1)
Poly(t-butyl methacrylate)

(PS-2)
Poly(i-butyl methacrylate)

(PS-3)
Poly [2-(methacryloyloxy) ethoxysuccinoyl-N, N-dioctadecylamide-co-2-hydroxyethyl acrylate ] [5–10:1 mole ratio]

(PS-4)
Poly [oxy (dioctadecyl) malonyloxyethyloxyethyl]

(PS-5)
Poly[oxyadipoyloxy(2,2-dioctadecyl)propylene]

(PS-6)
Poly[oxycarbonyliminehexamethyleneimino carbonyl-oxy (2,2-dioctadecylpropylene)]

(PS-7)
Poly(γ-methyl-L-glutamate-co-γ-n-octadecyl -glutamate)

From a review of the various polymers listed above it is apparent that in most instances the hydrophilic and lipophilic moieties can be present before polymerization. It therefore follows that in most instances the monomers from which the polymers are formed are themselves amphiphiles. The degree of polymerization can vary widely, ranging from dimers through oligomers and lower molecular weight polymers with maximum molecular weights being limited only by the ability of the polymers to retain their fluid properties under L-B assembly construction conditions. It is generally preferred to employ polymers that have molecular weights of less than about 20,000. The polymers can be homopolymers or polymers that contain mixtures of repeating units with compatible Langmuir-Blodgett film-forming properties.

The major surface 105 of the layer on which the organic layer unit is formed can take any convenient conventional form. The support portion 52 can be chosen so that the major surface is either hydrophilic or hydrophobic, thereby allowing the desired orientation of the L-B layer 14' on the major surface. When the support is not itself initially transparent to λ and of a lower refractive index than the L-B layer, it is recognized that a conventional buffer layer can be employed to correct these deficiencies. Buffer layers of the type disclosed in U.S. Pat. Nos. 4,946,235; 4,948,225; 4,955,977 and 4,971,426, the disclosures of which are here incorporated by reference, are specifically contemplated.

EXAMPLES

The invention is described and appreciated by reference to the following specific Examples. The Examples demonstrate the feasibility and advantages of constructions incorporating Y type L-B assemblies and the inferiority of X and Z type L-B assemblies.

In each of the Examples, preparations of Langmuir-Blodgett layer units were carried out using a commercial Langmuir two compartment trough mechanically equipped to transfer the substrate from one trough to the other, either while submerged in water contained in the reservoir or while held above the liquid reservoir. This permitted deposition on the substrate of different materials in each the two compartments in sequence permitting the film in each compartment to provide multiple layers on the substrate as the operation was repeated.

In some of the examples, evidence of nonlinear optical activity was measured by second harmonic generation (SHG). It will be appreciated that SHG is also a measure of the absolute magnitude of the linear electro-optic coefficient r33.

EXAMPLE 1

The purpose of this example is to demonstrate the capability of successful formation of a Y-type L-B assembly like 10c above but with polymer amphiphiles.

In one compartment a polymeric amphiphile PM-2 (hereinafter referred to as Film A) was dissolved in chloroform, spread on the surface of a pool of pure water and compressed. The amphiphile PM-2 can be schematically represented as Hy-D-E-A-L, where polymerization was through the Hy moiety.

In the other compartment polymeric amphiphile PS-1 (hereinafter also referred to as Film B) was dissolved in chloroform, spread on the surface of a pool of pure water and compressed. The polymeric amphiphile PS-1 can be schematically represented as Hy-S-L, where polymerization was through the Hy moiety.

Alternate deposition of PM-2 and PS-1 onto a silicon substrate made hydrophobic by reaction with octadecyl trichlorosilane by standard procedures was performed in a Film B before Film A (B/A) sequence fashion until six B/A bilayers were deposited. Six B layers were then deposited on top of the B/A layers.

This film was measured ellipsometrically where thickness varied less than 5% across the film and was (302Å) which is within 10% of expected values based on ellipsometric measurement of films A and B individually.

Second Order nonlinear optical activity was measured by Second Harmonic Generation (SHG) in reflection mode using 1064 nm input wavelength and measuring output intensity at 532 nm using an optical system similar to that reported frequently in the literature, which showed an increase in signal intensity, +3.25 volts relative to the uncoated substrate.

EXAMPLE 2

(a control)

The purpose of this example is to illustrate the deposition advantage achieved in Example 1 by employing the spacer amphiphiles (PS-1). The procedure of Example 1 was repeated, except that no spacer amphiphile PS-1 was employed. Instead, a first layer of PM-2 was deposited on the substrate, followed directly by second, third and subsequent layers of the same amphiphile, with layer thickness measurements being undertaken after each layer deposition.

Observations revealed that PM-2 failed to adhere to itself resulting in a failure to produce a multilayer structure. This failure can be expressed as the Film Transfer Ratio (FTR), which is a measurement of monolayer uptake by the substrate, where a complete layer should equal a ratio of 1.0. For the initial monolayer, the FTR was 1.01. For the second layer the FTR was only 0.08. Deposition of the third layer revealed an FTR of 0.749. Film thickness characterization was measured by ellipsometry. Sample thickness measured for the initial monolayer was (32Å +1Å). The thickness after the third layer deposition cycle varied randomly across the substrate between (41Å and 83Å). At no point on the film did the thickness reach the expected value of 96Å) for a 3-layer film.

EXAMPLE 3

The purpose of this example is to demonstrate the feasibility of substituting an Hy-A-E-D-L amphiphile for an Hy-D-E-A-L amphiphile. A procedure similar to that described in Example 1 was employed, except that the amphiphile PM-3 was substituted for PM-2. The amphiphile PM-3 can be schematically represented as Hy-A-E-D-L, where polymerization was through the Hy moiety. The significant difference in the amphiphile PM-3 as compared to PM-2 was the reversed orientation of the molecular dipole A-E-D in the polymer side chain.

Designating the PM-3 amphiphile layers as Film A and the PS-1 amphiphile layers as Film B, alternate deposition of these two materials onto a silicon substrate made hydrophobic by reaction with octadecyl trichlorosilane by standard procedures was performed in A/B fashion until an ABABA sequence of five layers had been deposited.

Film layer thickness measurements revealed that the layers were well formed, showing feasibility of employing PM-3 and PS-1 in combination to form an L-B layer unit.

EXAMPLE 4

(a control)

The purpose of this Example is to demonstrate the advantage of depositing the spacer amphiphile PS-1 on itself as compared to the amphiphile PM-3. Onto the ABABA layer sequence of Example 4 an additional A layer was deposited to permit the subsequent deposition of B layers with inverted orientations. In other words, after depositing to two AB bilayers, two A layers were deposited, to permit subsequent deposition of BA bilayers.

The last A layer of the initial five layer sequence exhibited an FTR of 0.9. The A layer deposited directly on the last A layer (the sixth layer overall) exhibited an FTR of 0.98. However, the next deposited B layer (the seventh layer overall) exhibited and FTR of −0.5, indicating removal of a portion of the preceding A layer. The next A layer (the eighth layer overall) exhibited an FTR of 1.0, with the next B layer (the ninth layer overall) again exhibiting an FTR of −0.5.

The thickness measured by ellipsometry for this film after 10 deposition strokes was (131Å). Based on thickness measurements of the individual materials the thickness of such a film should be (232ÅA). In fact the thickness is only (15Å), greater than calculated for layers 1 through 5 showing that the second half of the film structure did not form.

EXAMPLE 5

The purpose of this Example is to demonstrate the preparation of a thicker L-B layer unit. The procedure of Example 1 employed to produce 93 B/A bilayers in which PM-2 was employed to form the A layers and PS-2 was employed to form the B layers.

Film thickness characterization was measured by ellipsometry (thickness variability) and second order nonlinear optical activity was measured by SHG in a reflection mode using a 1064 nm input wavelength and measuring output intensity at 532 nm using a conventional optical system. Sample thickness varied less than 5% across this film and was (3992Å), which is within 5% of expected thickness based on the ellipsometric measurement of films of A and B individually. Film characterization by SHG showed a higher signal relative to thinner films. This corroborated a greater thickness.

EXAMPLE 6

The purpose of this example is to demonstrate the preparation of a thicker L-B layer unit. The procedure of Example 5 was repeated to produce an L-B layer unit containing 131 B/A bilayers, with PM-1 being employed to form the A layers and PS-2 being employed to form the B layers.

This film was visually clear and was tested for its ability to guide light. Polarized light from a Helium-Neon laser at 633 nm was coupled into the film through a prism by mechanical contact with the glass substrate. This film was able to guide light, with a propagation streak the entire length of the sample (over 3 cm). Attenuation of the Light beam was measured to be approximately 1 dB/cm of film length.

EXAMPLE 7

This example has as its purpose to demonstrate the preparation of a thicker L-B layer unit with variances in substrate and amphiphiles. The procedure of Example 6 was repeated to produce an L-B layer containing 124 B/A bilayers, with PM-2 being employed to form the A layers and PS-1 being employed to form the B layers. The substrate was soda-lime glass coated with a 1500Å to 2000Å layer of indium tin oxide (ITO). The layer sequence was completed by six B layers, demonstrating the self-adherency of PS-1.

EXAMPLE 8

This example has as its purpose to demonstrate the efficiency of a monomeric spacer amphiphile. This example also further illustrates the capability of controlling L-B layer unit thicknesses and to obtain thicknesses that correlate well with those expected from individual layer thicknesses.

Preparation of an L-B layer unit was carried out using arachidic acid (i.e., eicosanoic acid) and methyl arachidate together as H-S-L monomeric spacer amphiphiles to form A films. Arachidic acid and methyl arachidate were dissolved in chloroform in a 9:1 molar ratio, spread on water and compressed into a monolayer film. The water was pure with a 0.003 M concentration of cadmium ion added, which converted arachidic acid to cadmium arachidate. Three layers of the A film were deposited onto a hydrophilic silicon substrate for a length of 52 mm. A fourth layer of the A film was deposited for a length of 42 mm. The film layer at the air/water interface was removed by aspiration after film deposition. PM-1 was dissolved in chloroform, spread on the same water solution and compressed into a monolayer B film. The B film was deposited onto the existing A film layers, creating an A/B bilayer with the fourth cadmium arachidate and methyl arachidate layer. After deposition, the B film layer was also removed from the air/water interface. Arachidic acid and methyl arachidate in chloroform were again spread and compressed into a monolayer A film and deposited onto the existing film structure, this time for a length of 32 mm. PM-1 in chloroform was spread, compressed into a monolayer B film and deposited onto the existing film layer structure, creating two A/B bilayers. A third A/B Bilayer was deposited in the same manner as the second A/B bilayer. A bilayer of cadmium arachidate was deposited on top of the film for a length of 18 mm creating a step film structure with the following relative (not-to-scale) architecture:

```
        AAAAAAA
        AAAAAAA
        BBBBBBBBBB
        AAAAAAAAAA
        BBBBBBBBBB
        AAAAAAAAAA
```
-continued
```
        BBBBBBBBBBBBBBBB
        AAAAAAAAAAAAAAAA
        AAAAAAAAAAAAAAAAAAAA
        AAAAAAAAAAAAAAAAAAAA
        AAAAAAAAAAAAAAAAAAAA
                Substrate
```

Film thickness characterization was measured by ellipsometry (thickness variability). Sample thickness varied less than 5% across each film step (89Å, 146Å, 272Å, and 328Å) and was within 5% of overall expected thickness (326Å) based on the ellipsometric measurement of monolayers of A and B individually.

EXAMPLE 9

The purpose of this example is to demonstrate the capability of forming a Y type Langmuir-Blodgett assembly like that of 9a above, but with polymer amphiphiles. By being able to employ molecular dipole containing amphiphiles in next adjacent layers of the L-B layer the potential exists for a four-fold increase in conversion efficiency as compared to employing a spacer amphiphile in alternate monomolecular layers.

PM-3 was dissolved in chloroform, spread on pure water and compressed into a monolayer A film. The A film was deposited onto a silicon substrate, which was made hydrophobic by reaction with octadecyl trichlorosilane by standard procedures. The film was deposited as a monolayer for a length of 60 mm. The A film layer at the air/water interface was removed by aspiration after film deposition. PM-1 was dissolved in chloroform, spread on pure water and compressed into a monolayer B film. The B film was deposited onto the existing A film layer, creating an A/B bilayer. After deposition, this film layer was also removed from the air/water interface. PM-3 in chloroform was again spread and compressed into a monolayer A film and deposited onto the existing A/B bilayer for a length of 42 mm. PM-1 in chloroform was spread, compressed into a monolayer film and deposited onto the existing film layer structure, creating two A/B bilayers. A third A/B bilayer was deposited in the same manner as bilayers 1 and 2, only for a length of 33 mm. A fourth A/B bilayer was deposited, similar to bilayers 1, 2, and 3, for a length of 23 mm, creating a step film architecture.

Film thickness characterization was measured by ellipsometry (thickness variability) and second order nonlinear optical activity by SHG in a reflection mode using a 1064 nm input wavelength and measuring output intensity at 532 nm using a conventional optical system. Sample thickness varied less than 5% across each bilayer (67Å, 152Å, 223Å, and 290Å respectively) and was within 10% of overall expected thickness (272Å) based on the ellipsometric measurement of monolayers of A and B individually. Film characterization by SHG showed incremental signal enhancement relative to the bilayer increments, as well as film uniformity for each bilayer.

The invention has been described in detail with particular reference to certain preferred embodiments thereof, but it will be understood that variations and modifications can be effected within the spirit and scope of the invention.

What is claimed:

1. An integrated electro-optic device for scanning a photosensitive medium with a focused line of light comprising a plurality of closely spaced intensity-modulated pixels to record a two-dimensional image, said device comprising:

an optical waveguide comprising a Langmuir-Blodgett film of optically transparent electro-optic polymer, said waveguide being adapted to transmit, by total internal reflection, a beam of light in a direction perpendicular to the film thickness;

means for producing a uniform phase front of light within said waveguide;

an array of electrodes comprising a planar electrode disposed on one side of a major surface of said waveguide, wherein said side of a major surface is perpendicular to the direction of film thickness of said waveguide, and a linear array of individual pixel-sized electrodes on the opposing side of said waveguide;

means for selectively applying an electric field between each of selected individual, pixel-sized electrodes and said planar electrode to cause selected portions of said waveguide to perturb selected portions of said phase front in accordance with pixel information to be recorded;

means for converting a perturbed wavefront of light within said optical waveguide to an intensity-modulated pixel pattern; and means for imaging said intensity modulated pixel pattern at an image plane outside said optical waveguide; and further wherein, said Langmuir-Blodgett film comprises multiple layers of amphiphile molecules alternating with layers of spacer molecules such that said amphiphile molecules have the same polarity and comprise a hydrophilic head group and a lipophilic tail group joined through a linking group, and wherein said Langmuir-Blodgett film has a thickness of at least 210 nm and a second order polarizability of at least $10^{-9}$ electrostatic units.

2. The electro-optic device of claim 1 wherein said linking group comprises azobenzene and said Langmuir-Blodgett film exhibits a light attenuation of no more than about 1 db/cm.

3. The electro-optic device of claim 1 wherein said means for producing comprises a laser diode operatively-coupled to said electro-optic film 4. The electro-optic device of claim 1 wherein said amphiphiles are polymerically linked within each layer of amphiphile molecules.

5. The electro-optic device of claim 4 wherein the polymerically linked amphiphiles are prepared by polymerization in the presence of a comonomer.

6. The electro-optic device of claim 1 wherein said waveguide exhibits an absolute electro-optic coefficient of at least 10 pm/V.

7. The electro-optic device of claim 1 wherein said amphiphile molecules comprise an electron accepting hydrophilic head group selected from the group consisting of $C(CN)C_6H_4C(CN)_2$, $NO_2$, $CN$, $CHC(CN)_2$, and $C(CN)C(CN)_2$.

8. An integrated electro-optic device for scanning a photosensitive medium with a focused line of light comprising a plurality of closely spaced, intensity-modulated pixels to record a two-dimensional image, said electro-optic device comprising:

a base support;

a planar electrode layer disposed on a surface of said base support;

a first buffer layer disposed atop said planar electrode layer, said first buffer layer comprising a transparent dielectric material;

an optical waveguide layer disposed on said base support and overlying said first buffer layer and said planar electrode layer, said waveguide layer comprising a Langmuir-Blodgett film of electro-optic polymer material having a thickness and a refractive index, said waveguide layer being adapted to transmit therethrough, by multiple total internal reflection, a beam of light in a direction perpendicular to the film thickness;

a second buffer layer deposited atop said film, said second buffer layer comprising a transparent dielectric material, said first and second buffer layers each having a refractive index lower than the refractive index of said film;

a third layer of transparent material having a higher refractive index than said first and second buffer layers, said third layer positioned between said first buffer layer and said Langmuir-Blodgett film means defining a plurality of spaced parallel electrodes atop said second buffer layer;

means for producing a uniform phase front of light within said film;

means for selectively applying an electric field between each of selected spaced parallel electrodes and said planar electrode layer to cause selected portions of said film therebetween to perturb selected portions of said phase front in accordance with pixel image information to be recorded;

means for converting a perturbed wavefront of light within said waveguide layer to an intensity-modulated pixel pattern; and means for projecting an image of said intensity-modulated pixel pattern upon the surface of a photosensitive medium.

9. The electro-optic device of claim 8 wherein said converting means comprises Schlieren optics.

10. The electro-optic device of claim 8, wherein said Langmuir-Blodgett film is deposited on said third layer by dip-coating.

11. The electro-optic device of claim 8 wherein said means for producing comprises a laser diode operatively-coupled to said electro-optic film.

12. The electro-optic device of claim 8 wherein said Langmuir-Blodgett film is formed of noncentro-symmetric molecules and wherein said molecules are oriented in the same direction to automatically pole said film.

13. The electro-optic device of claim 12 wherein said waveguide layer has a plane and wherein said molecules are perpendicular to the plane of said waveguide layer.

14. The electro-optic device of claim 4 wherein said optical waveguide layer has a refractive index that is about equal to said refractive index of said third layer.

* * * * *